(12) United States Patent
Fujita

(10) Patent No.: US 9,399,487 B2
(45) Date of Patent: Jul. 26, 2016

(54) VEHICLE BODY FRONT PORTION STRUCTURE

(71) Applicant: TOYOTA JIDOSHA KABUSHIKI KAISHA, Toyota-shi (JP)

(72) Inventor: Daisuke Fujita, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/641,694

(22) Filed: Mar. 9, 2015

(65) Prior Publication Data

US 2015/0329143 A1    Nov. 19, 2015

(30) Foreign Application Priority Data

May 15, 2014    (JP) .................. 2014-101694

(51) Int. Cl.
*B62D 21/11* (2006.01)
*B62D 21/15* (2006.01)
*B60G 7/02* (2006.01)

(52) U.S. Cl.
CPC ........ *B62D 21/11* (2013.01); *B60G 7/02* (2013.01); *B62D 21/155* (2013.01); *B60G 2200/14* (2013.01); *B60G 2204/143* (2013.01); *B60G 2204/4302* (2013.01); *B62D 21/152* (2013.01)

(58) Field of Classification Search
CPC ...... B62D 21/11; B62D 21/15; B62D 21/152; B62D 21/155; B60G 7/02; B60G 7/001; B60G 2200/14; B60G 2204/143; B60G 2204/4302; B60G 2206/014

USPC ................ 280/784, 124.134, 124.15
See application file for complete search history.

(56) References Cited

U.S. PATENT DOCUMENTS

| | | | | |
|---|---|---|---|---|
| 4,817,973 A | * | 4/1989 | Takeda | B62D 21/11 280/124.13 |
| 4,951,964 A | * | 8/1990 | Sakamoto | B62D 21/155 180/291 |
| 7,178,817 B1 | * | 2/2007 | Welles | B60G 9/003 280/124.128 |
| 2003/0122337 A1 | * | 7/2003 | Matsumoto | B62D 21/11 280/124.109 |
| 2015/0298518 A1 | * | 10/2015 | Andersson | B60G 3/20 280/86.5 |

FOREIGN PATENT DOCUMENTS

| | | |
|---|---|---|
| JP | 2006 175988 | 7/2006 |
| JP | 2012 166739 | 9/2012 |

* cited by examiner

*Primary Examiner* — Keith Frisby
(74) *Attorney, Agent, or Firm* — Oblon, McClelland, Maier & Neustadt, L.L.P.

(57) ABSTRACT

A vehicle body front portion structure is provided with a suspension member, a vertical wall and a protruding member. A side portion of the suspension member is disposed at a vehicle body lower side of a front side member. The vertical wall is formed at the suspension member and includes a coupling portion to which a vehicle width direction inner side end portion of a lower arm is coupled, which lower arm supports a front wheel. The protruding member is fastened to a fastening portion provided in the vertical wall, at a vehicle width direction outer side relative to the coupling portion, so as to protrude to the vehicle width direction outer side relative to the front side member in plan view.

5 Claims, 7 Drawing Sheets

VEHICLE BODY FRONT PORTION STRUCTURE

CROSS-REFERENCE TO RELATED APPLICATION

This application claims priority under 35 USC 119 from Japanese Patent Application No. 2014-101694 filed May 15, 2014, the disclosure of which is incorporated by reference herein.

BACKGROUND

1. Technical Field

The present invention relates to a vehicle body front portion structure.

2. Related Art

A vehicle front portion structure in which a front end portion of a subframe, which is disposed at a vehicle body lower side of a front side member, protrudes to a vehicle width direction outer side further than the front side member in a bottom view has been known since heretofore (for example, see Japanese Patent Application Laid-Open (JP-A) No. 2012-166739). An impact absorption member is provided at the front end portion of the subframe. A vehicle width direction inner side end portion of a lower arm that supports a front wheel is attached partway along the subframe.

However, in a micro-wrap collision, an offset collision or the like, a collision body collides with a vehicle front face at the vehicle width direction outer side relative to the front side member. When an impact load caused by a micro-wrap collision, offset collision or the like is inputted from the vehicle body forward side through the impact absorption member to the front end portion of the subframe and the front wheel or the like, if the vehicle width direction inner side end portion of the lower arm stays attached to the subframe, a rear portion side of the front wheel is pulled to the vehicle width direction inner side and moves to the vehicle width direction inner side relative to a rocker. Thus, the impact load is less likely to be transmitted from the front wheel to the rocker in an axial direction thereof.

SUMMARY

The present invention provides a vehicle body front portion structure that may transmit an impact load from a front wheel to a rocker in an axial direction thereof when a micro-wrap collision, an offset collision or the like occurs.

A vehicle body front portion structure according to a first aspect of the present invention includes: a suspension member, a side portion of the suspensions member being disposed at a vehicle body lower side of a front side member; a vertical wall that is formed at the suspension member and that includes a coupling portion to which a vehicle width direction inner side end portion of a lower arm is coupled, the lower arm supporting a front wheel; and a protruding member that is fastened to a fastening portion provided in a vertical wall, at the vehicle width direction outer side relative to the coupling portion, so as to protrude to the vehicle width direction outer side relative to the front side member in plan view.

According to the first aspect of the present invention, the vertical wall is formed at the suspension member. The vertical wall includes the coupling portion at which the vehicle width direction inner side end portion of the lower arm that supports the front wheel is coupled. The protruding member is fastened to the fastening portion provided in the vertical wall, at the vehicle width direction outer side relative to the coupling portion, so as to protrude to the vehicle width direction outer side relative to the front side member in plan view.

Therefore, when an impact load is inputted to the protruding member from the vehicle body forward side by a micro-wrap collision, an offset collision or the like, the coupling portion of the vertical wall, which is at the vehicle width direction inner side relative to the fastening portion at which the protruding member is fastened, is twisted and broken, and the vehicle width direction inner side end portion of the lower arm is detached from the vertical wall of the suspension member. Therefore, pulling of the rear portion side of the front wheel to the vehicle width direction inner side by the lower arm is suppressed or prevented. Thus, the impact load inputted to the front wheel is transmitted from the front wheel to a rocker in an axial direction thereof. That is, when there is a micro-wrap collision, an offset collision or the like, an impact load may be transmitted from the front wheel to the rocker in the axial direction thereof.

In a vehicle body front portion structure according to a second aspect of the present invention, in the first aspect, the protruding member and a front bumper reinforcement are linked by a front member.

According to the second aspect of the present invention, the protruding member and the front bumper reinforcement are linked by the front member. Therefore, an impact load inputted to the front bumper reinforcement by a micro-wrap collision, an offset collision or the like is efficiently transmitted through the front member to the protruding member.

In a vehicle body front portion structure according to a third aspect of the present invention, in the first aspect of the invention, the protruding member sandwiches the fastening portion with a reinforcing plate and is fastened to the fastening portion, the reinforcing plate extending to the coupling portion.

According to the third aspect of the present invention, the protruding member sandwiches and is fastened to the fastening portion with the reinforcing plate that extends to the coupling portion. Therefore, when an impact load is inputted to the protruding member from the vehicle body forward side by a micro-wrap collision, an offset collision or the like, the coupling portion of the vertical wall, which is at the vehicle width direction inner side relative to the fastening portion (the reinforcing plate), is twisted and broken by the reinforcing plate. Thus, the vehicle width direction inner side end portion of the lower arm is easily detached from the vertical wall of the suspension member. That is, when the impact load is inputted to the protruding member from the vehicle body forward side, the coupling portion of the vertical wall at the vehicle width direction inner side relative to the fastening portion may be broken efficiently. Thus, the vehicle width direction inner side end portion of the lower arm may be easily detached from the vertical wall of the suspension member.

In a vehicle body front portion structure according to a fourth aspect of the present invention, in the vehicle body front portion structure according to the first aspect of the invention, a plate thickness of the fastening portion is thicker than a plate thickness of the coupling portion.

According to the fourth aspect of the present invention, the plate thickness of the fastening portion is thicker than the plate thickness of the coupling portion. Therefore, when an impact load is inputted to the protruding member from the vehicle body forward side by a micro-wrap collision, an offset collision or the like, the coupling portion of the vertical wall at the vehicle width direction inner side relative to the fastening portion is more efficiently twisted and broken because of the difference in plate thicknesses. Thus, the vehicle width direction inner side end portion of the lower arm is easily detached from the vertical wall of the suspension member. That is, when the impact load is inputted to the protruding member from the vehicle body forward side, the coupling portion of the vertical wall at the vehicle width direction inner side relative to the fastening portion may be broken efficiently. Thus, the vehicle width direction inner side end portion of the lower arm may be easily detached from the vertical wall of the suspension member.

In a vehicle body front portion structure according to a fifth aspect of the present invention, in the first aspect of the invention, the protruding member is structured with a higher strength than the suspension member.

According to the fifth aspect of the present invention, because the protruding member is structured with a higher strength than the suspension member, when a micro-wrap collision, an offset collision or the like occurs, an impact load may be efficiently transmitted from the front wheel to the rocker in the axial direction thereof.

BRIEF DESCRIPTION OF THE DRAWINGS

Exemplary Embodiments of the present invention will be described in detail based on the following figures, wherein.

DETAILED DESCRIPTION

Figure 1:
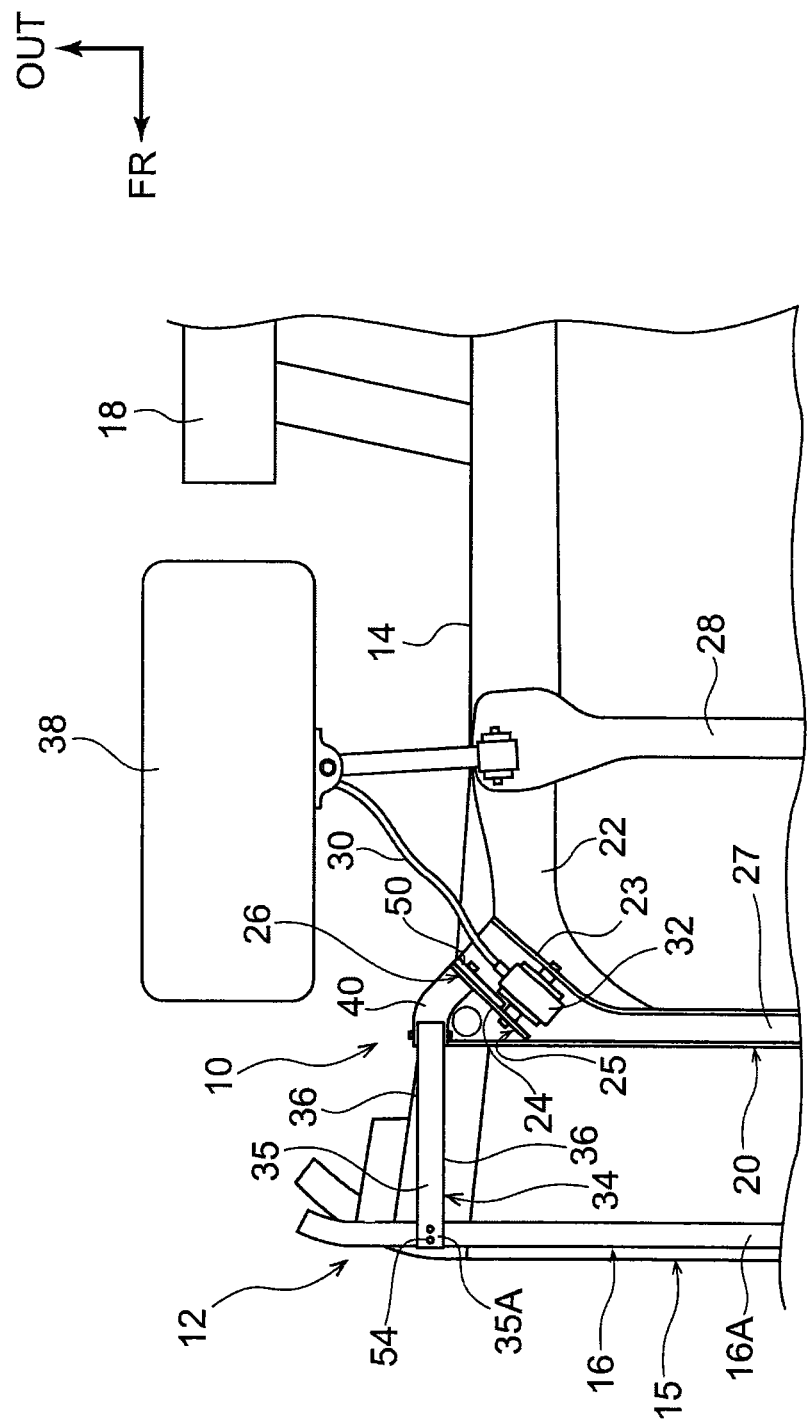
FIG. 1 is a bottom view showing a vehicle body front portion structure in accordance with a first exemplary embodiment.

Herebelow, exemplary embodiments relating to the present invention are described in detail in accordance with the drawings. For convenience of description, the arrow UP that is shown where appropriate in the drawings indicates a vehicle body upward direction, the arrow FR indicates a vehicle body forward direction, and the arrow OUT indicates a vehicle width direction outer side. In the following descriptions, where the directions front, rear, up, down, left and right are used without being particularly specified, the same represent the front and rear in the vehicle body front-and-rear direction, up and down in the vehicle body up-and-down direction, and left and right in the vehicle body left-and-right direction (the vehicle width direction). Although the drawings show the left side of the vehicle, the right side of the vehicle is the same, with left-right symmetry.

—First Exemplary Embodiment—

First, a vehicle body front portion structure 10 according to the first exemplary embodiment is described. As shown in FIG. 1, front side members 14 are provided in a pair, spaced by a pre-specified spacing, at the vehicle body rightward side and the vehicle body leftward side of a front portion side of a vehicle 12. Each front side member 14 has a shape with a rectangular closed cross section that extends in the vehicle body front-and-rear direction.

A front bumper upper reinforcement 15 spans to extend in the vehicle width direction between vehicle body forward side end portions of the pair of left and right front side members 14. The front bumper upper reinforcement 15 has a shape with a rectangular closed cross section. A front bumper reinforcement 16 is provided extending in the vehicle width direction at the lower side of the front bumper upper reinforcement 15. The front bumper reinforcement 16 has a shape with a rectangular closed cross section.

A rocker 18 is provided at the vehicle width direction outer side of each of the pair of left and right front side members 14 in a bottom view (a plan view), at the vehicle rearward side of a front wheel 38. Each rocker 18 has a shape with a rectangular closed cross section that extends in the vehicle front-and-rear direction. The front side members 14, rockers 18 and the like are vehicle body framework members of the vehicle 12. In particular, each rocker 18 is constituted to have high strength and high rigidity with respect to impact loads inputted in the vehicle body front-and-rear direction (an axial direction of the rocker 18).

Left and right both end portions 22 of a suspension member 20 are disposed at the respective vehicle body lower sides of the pair of left and right front side members 14. The suspension member 20 relating to the present exemplary embodiment is fabricated of aluminum. Vehicle width direction inner side end portions 32 (hereinafter referred to as pivot portions) of lower arms 30 are attached to the vehicle body forward sides of the left and right both end portions 22 of the suspension member 20. Each lower arm 30 structures, for example, a strut-type suspension. Each pivot portion 32 is attached to be turnable about an axial direction that is a horizontal direction.

Figure 2:
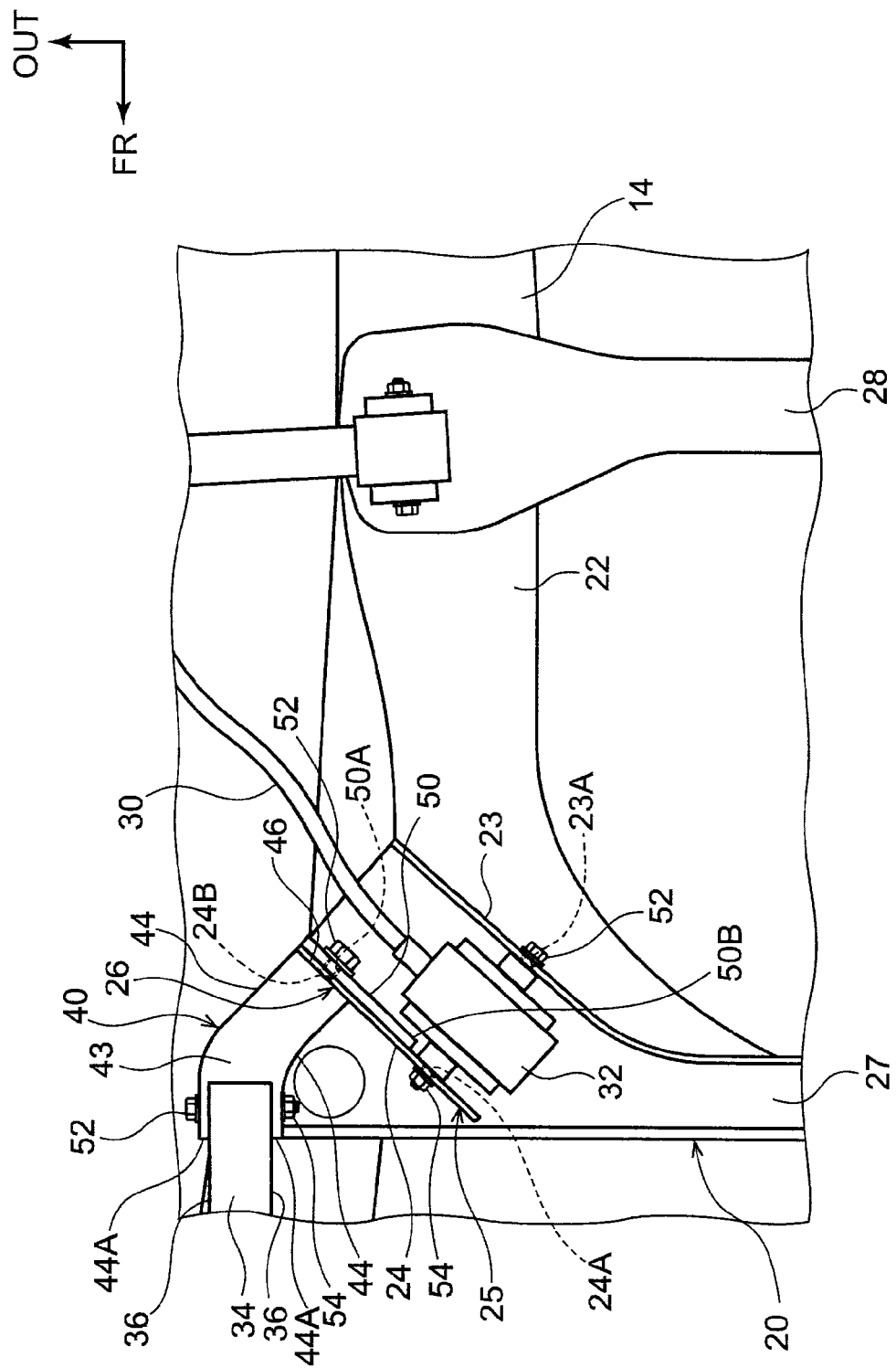
FIG. 2 is a bottom view showing an enlargement of a portion of the vehicle body front portion structure in accordance with the first exemplary embodiment.
Figure 3:
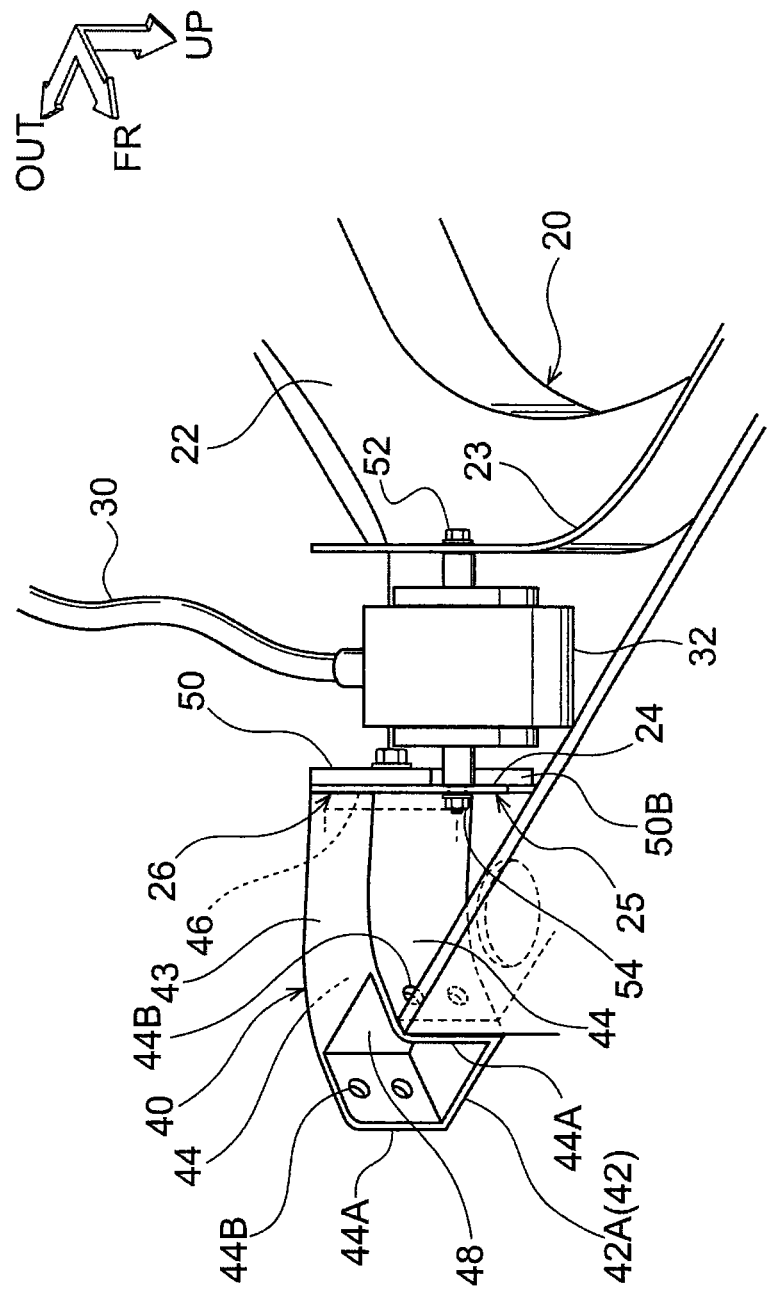
FIG. 3 is a perspective view showing an enlargement of a portion of the vehicle body front portion structure in accordance with the first exemplary embodiment.

To describe this in more detail, as shown in FIG. 2 and FIG. 3, flat plate-shaped vertical walls 23 and 24 integrally stand from a lower face at the vehicle body forward side of each of the left and right both end portions 22 of the suspension member 20. The vertical walls 23 and 24 oppose one another with a predetermined spacing therebetween.

The vertical wall 24 at the vehicle body forward side and the vertical wall 23 at the vehicle body rearward side opposing the vertical wall 24 are provided to be inclined to the vehicle width direction rearward-outer side (the vehicle width direction forward-inner side) in bottom view (plan view). Hole portions (for coupling) 23A and 24A are formed to oppose one another at predetermined positions, for coupling of the pivot portion 32 of the lower arm 30. A penetrating hole for bolt insertion (not shown in the drawings) is formed in the pivot portion 32 of the lower arm 30.

Accordingly, the pivot portion 32 of the lower arm 30 is disposed between the vertical walls 23 and 24. A bolt 52 is inserted through the hole portion 23A in the vertical wall 23 at the vehicle body rearward side, the penetrating hole in the pivot portion 32, and the hole portion 24A in the vertical wall 24 at the vehicle body forward side, and the bolt 52 is screwed into a nut 54. Thus, the pivot portion 32 is coupled to be turnable about the axial direction, which is a direction normal to the vertical walls 23 and 24 (the horizontal direction).

The vehicle width direction outer side end portion of the lower arm 30 is attached to the vehicle width direction inner side of the front wheel 38. The lower arm 30 supports the front wheel 38. The periphery of the hole portion 24A of the vertical wall 24 at the vehicle body forward side serves as a coupling portion 25 to which the pivot portion 32 of the lower arm 30 is turnably coupled.

As shown in FIG. 1 and FIG. 2, vehicle body forward side end portions of the left and right both end portions 22 of the suspension member 20 are linked with one another by a front cross member 27 that extends in the vehicle width direction, and vehicle body rearward sides of the left and right both end portions 22 of the suspension member 20 are linked with one another by a rear cross member 28 that extends in the vehicle width direction.

As shown in FIG. 1 to FIG. 3, protruding members 40 are attached to vehicle body forward side end portions of the left and right both end portions 22 of the suspension member 20, in detail to the vehicle body forward side of the vertical wall 24. Each protruding member 40 has a higher strength than the suspension member 20, being fabricated of, for example, steel. More specifically, each protruding member 40 is attached at the vehicle width direction outer side relative to the coupling portion 25 (the periphery of the hole portion 24A). The protruding member 40 is attached such that at least a front end portion thereof protrudes to the vehicle width direction outer side relative to the front side member 14 in bottom view (plan view).

As shown in FIG. 2 and FIG. 3, the protruding member 40 is formed in a shape with a closed cross section, including an upper wall 42, a lower wall 43, and a pair of side walls 44 that integrally link each of respective left and right end portions of the upper wall 42 and the lower wall 43. The upper wall 42 and the lower wall 43 are formed in inflected shapes, as seen in a plate thickness direction (in bottom view), in-plane directions of which curve in substantially circular arc shapes from the vehicle body forward side to the vehicle body rearward-inner side. Each side wall 44 is formed in an inflected shape, as seen in a width direction thereof (in bottom view), an out-of-plane direction of which curves in a substantially circular arc shape from the vehicle body forward side to the vehicle body rearward-inner side.

A vehicle body rearward side end portion of the protruding member 40 is closed off by a rear wall 46 in a rectangular flat plate shape. The rear wall 46 is formed with a greater plate thickness than the vertical wall 24, and is integrally joined to the vehicle body rearward side end portion of the protruding member 40 by welding or the like. A hole portion for fastening (not shown in the drawings) is formed at a central portion of the rear wall 46. A welded nut (not shown in the drawings) is provided at an inner face of the rear wall 46, coaxially with the hole portion.

A hole portion 24B (for fastening) is formed in the vertical wall 24 at the vehicle width direction outer side relative to the coupling portion 25 (the periphery of the hole portion 24A). The hole portion 24B is for fastening of the protruding member 40. The periphery of the hole portion 24B (a vehicle width direction outer side end portion of the vertical wall 24) serves as a fastening portion 26 at which the protruding member 40 is fastened.

A reinforcing plate 50 is provided at an inner face side of the fastening portion 26 (of the vertical wall 24) to which the protruding member 40 is fastened (i.e., the face of the fastening portion 26 at which the pivot portion 32 of the lower arm 30 is disposed). The reinforcing plate 50 has a rectangular flat plate shape with a greater plate thickness than the vertical wall 24 (for example, the same plate thickness as the rear wall 46) and a width that is about the same as the height of the vertical wall 24. A hole portion for fastening 50A is formed in the reinforcing plate 50.

Thus, the fastening portion 26 of the vertical wall 24 is nipped by the rear wall 46 and the reinforcing plate 50, and another of the bolt 52 is inserted into the hole portion for fastening 50A of the reinforcing plate 50, the hole portion 24B of the vertical wall 24, and the rear wall 46, and the bolt 52 is screwed into the welded nut. Thus, the protruding member 40 is fastened to the vertical wall 24 (i.e., the fastening portion 26). A vehicle width direction inner side end portion (one length direction end portion) 50B of the reinforcing plate 50 extends as far as a position close to the hole portion for fastening 24A (to a position reaching the coupling portion 25).

As shown in FIG. 3, a vehicle body forward side end portion of the protruding member 40 is closed off by a front wall 48 in a rectangular flat plate shape. The front wall 48 has, for example, the same plate thickness as the rear wall 46, and is integrally joined to the vehicle body forward side end portion of the protruding member 40 by welding or the like. Flange portions 42A and 44A are integrally formed at the upper wall 42 and each side wall 44. The flange portions 42A and 44A are each formed in a rectangular shape that protrudes to the vehicle body forward side relative to the front wall 48.

A rear end face of a front member 34 abuts (presses) against the front wall 48 at least when a load is inputted from the vehicle body forward side. The front member 34 has a closed cross section shape (a square tube shape), which is described below. The front member 34 is fastened to the protruding member 40 in a state in which a slight gap is formed between the rear end face of the front member 34 and the front wall 48 (or a state in which the same are in contact).

To describe this in more detail, a hole portion for fastening 44B is formed in each flange portion 44A of the side walls 44. Portions for fastening (not shown in the drawings) are formed in rear end portions of side walls 36 of the front member 34 shown in FIG. 2, which oppose one another in the vehicle width direction. Accordingly, another of the bolt 52 is inserted from the vehicle width direction outer side through the hole portion for fastening 44B of one flange portion 44A, the respective hole portions in the side walls 36, and the hole portion for fastening 44B in the other flange portion 44A, and the bolt 52 is screwed into another of the nut 54. Thus, the rear end portion of the front member 34 is fastened to the front end portion of the protruding member 40.

The front member 34 is formed in the square tube shape (a closed cross section shape), extending in the vehicle body front-and-rear direction. As shown in FIG. 1, a flange portion 35A is integrally formed at a lower wall 35 of a front end portion of the front member 34. The flange portion 35A protrudes to the vehicle body forward side. A flange portion (not shown in the drawings) is also integrally formed at an upper wall (not shown in the drawings) of the front end portion of the front member 34. This flange portion is vertically symmetrical with the flange portion 35A.

Hole portions for fastening (not shown in the drawings) are formed in the flange portion of the upper wall and the flange portion 35A of the lower wall 35. Respective hole portions for fastening (not shown in the drawings) are also formed in an upper wall (not shown in the drawings) and a lower wall 16A of the front bumper reinforcement 16, close to the vehicle width direction outer side of the front bumper reinforcement 16.

Accordingly, the flange portion of the upper wall is superposed with the upper wall of the front bumper reinforcement 16, the flange portion 35A of the lower wall 35 is superposed with the lower wall 16A of the front bumper reinforcement 16, a bolt (not shown in the drawings) is inserted through the respective hole portions from the vehicle body upper side, and the bolt is screwed into another of the nut 54. Thus, the front end portion of the front member 34 is fastened to the front bumper reinforcement 16. In this manner, the front bumper reinforcement 16 and the protruding member 40 are linked by the front member 34.

Now, operations of the vehicle body front portion structure 10 according to the first exemplary embodiment structured as described above are described.

Figure 4:
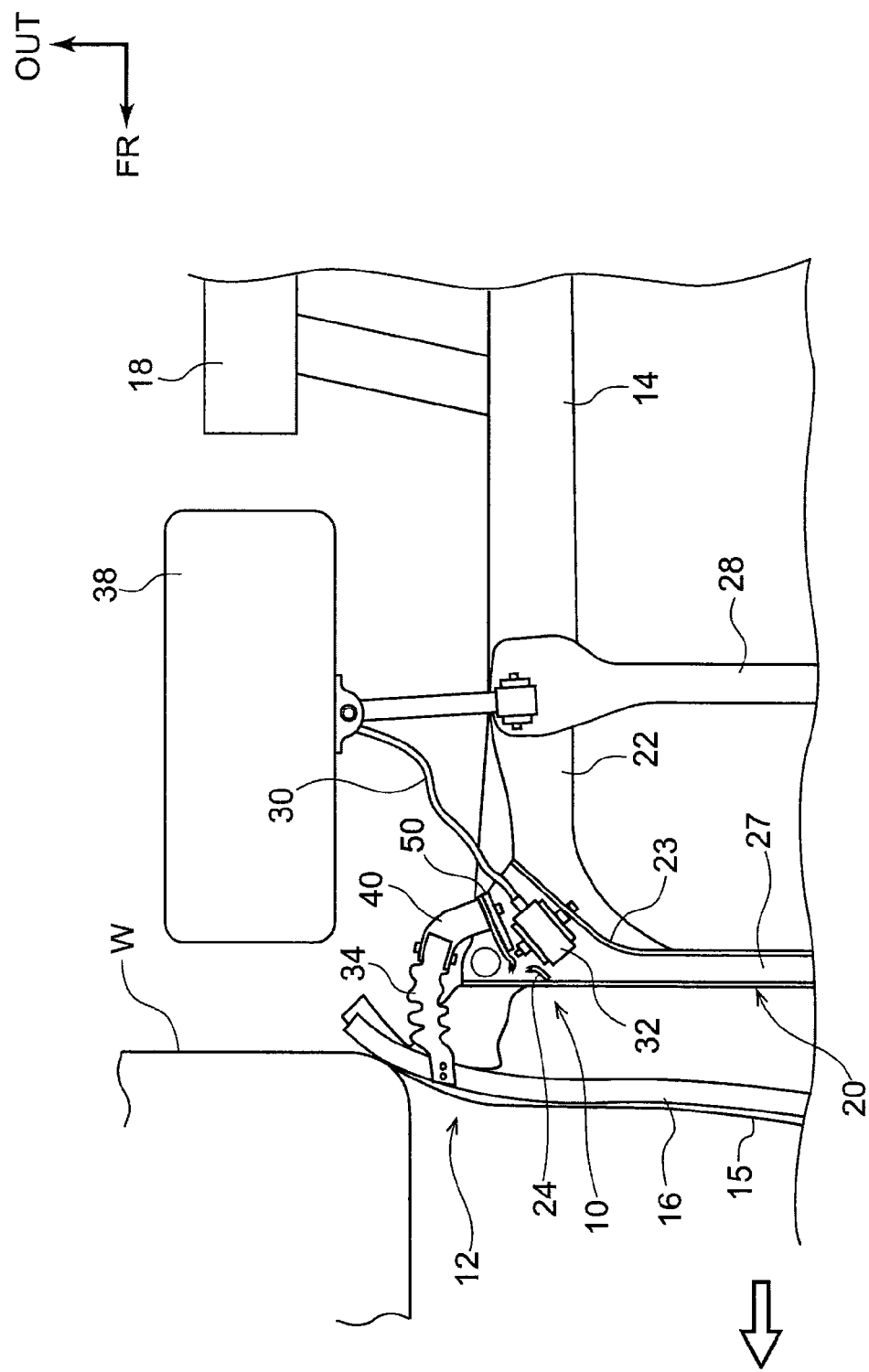
FIG. 4 is a bottom view showing a state in which a coupling portion of a vertical wall of a suspension member has been broken by a micro-wrap collision.

As shown in FIG. 4, when the vehicle 12 has a micro-wrap collision (or an offset collision) with a barrier W, that is, when a vehicle width direction outer side end portion of the front bumper reinforcement 16 collides with the barrier W, an impact load toward the vehicle body rearward side is inputted via the front bumper reinforcement 16 to the front member 34.

When the impact load toward the vehicle body rearward side is inputted to the front member 34, the front member 34 moves toward the vehicle body rearward side while collapsing in the axial direction thereof and, via the front wall 48, the front member 34 pushes the protruding member 40 toward the vehicle body rearward side. Thus, when the front bumper reinforcement 16 and the protruding member 40 are linked by the front member 34, the impact load inputted to the front bumper reinforcement 16 may be efficiently transmitted to the protruding member 40.

The protruding member 40 is formed in the inflected shape that curves in a substantially circular arc shape from the vehicle body forward side to the vehicle body rearward-inner side in bottom view (plan view). Therefore, when the impact load from the vehicle body forward side is inputted to the protruding member 40 via the front member 34, the protruding member 40 moves to the vehicle body rearward-inner side with an axial direction thereof being a vertical direction and, via the rear wall 46, the protruding member 40 pushes the vertical wall 24 (the fastening portion 26) of the suspension member 20 to the vehicle width direction inner side.

Because the protruding member 40 is fastened to both the reinforcing plate 50 and the fastening portion 26, which is the vehicle width direction outer side end portion of the vertical wall 24, the protruding member 40 is securely fastened to the fastening portion 26. The strength of the fastening portion 26 (including the reinforcing plate 50) is higher than the strength of the coupling portion 25. Moreover, the fastening portion 26 (the vertical wall 24) is inclined to the vehicle width direction rearward-outer side (the vehicle width direction forward-inner side) in bottom view (plan view).

Therefore, as the protruding member 40 moves to the vehicle body rearward-inner side, the protruding member 40 pushes the fastening portion 26 (including the reinforcing plate 50) to the vehicle width direction inner side. Therefore, the coupling portion 25 that is a portion of the vertical wall 24 at the vehicle width direction inner side relative to the reinforcing plate 50 (the fastening portion 26) is twisted toward the vehicle forward-outer side in bottom view (plan view) and breaks.

In particular, because the vehicle width direction inner side end portion 50B of the reinforcing plate 50 extends to a position close to the hole portion 24A (to a position that reaches the coupling portion 25), the vertical wall 24 is efficiently twisted from the coupling portion 25 containing the hole portion 24A and breaks. Thus, the pivot portion 32 of the lower arm 30 that is coupled to the coupling portion 25 is easily detached from the coupling portion 25 (the vertical wall 24).

Figure 5:
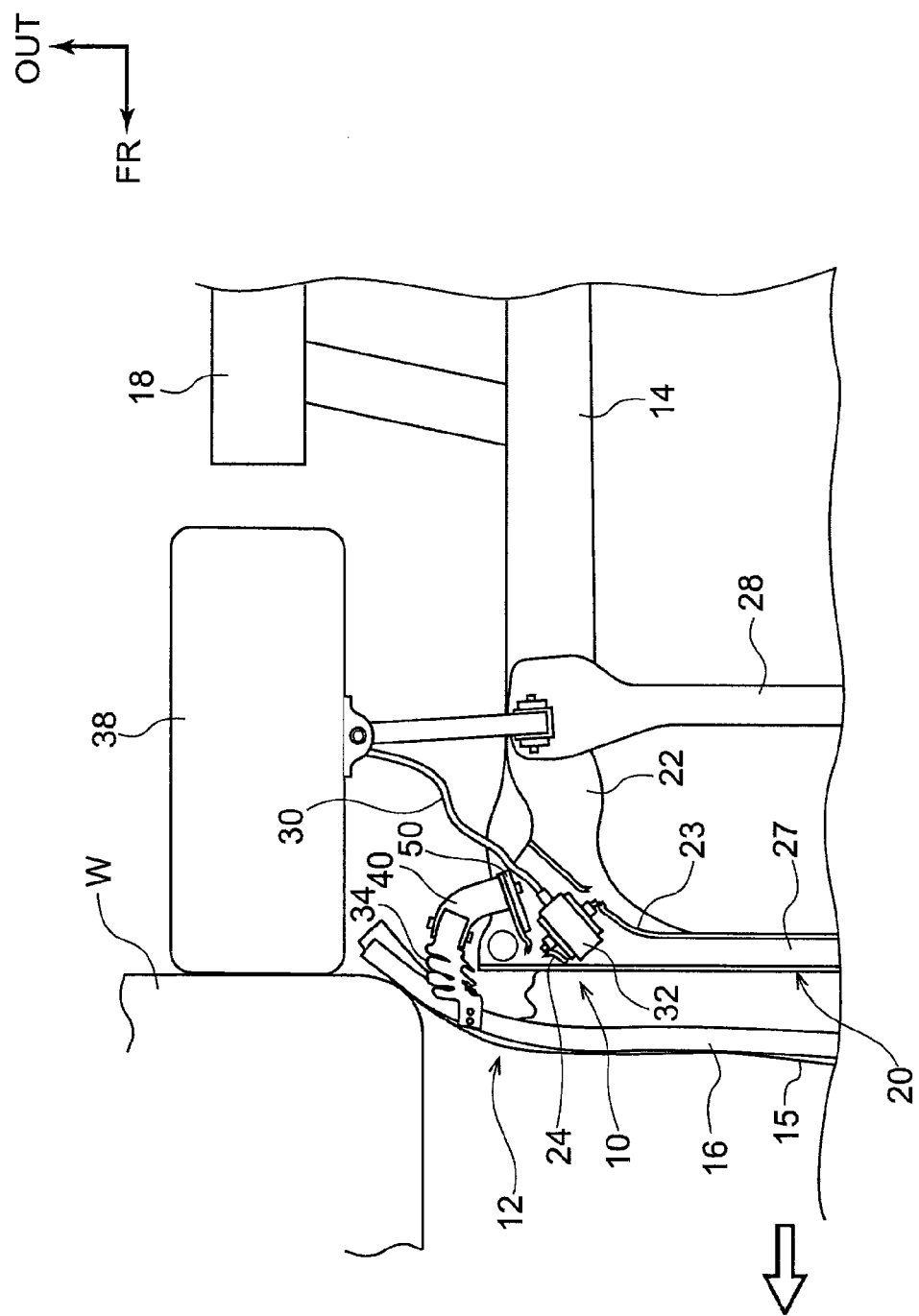
FIG. 5 is a bottom view showing a state in which, due to a micro-wrap collision, a vehicle width direction inner side end portion of a lower arm is detached from the vertical wall of the suspension member and a front wheel collides with a barrier.

Hence, because the pivot portion 32 of the lower arm 30 is in a state that is coupled only to the vertical wall 23 at the vehicle body rearward side, as shown in FIG. 5, when the impact load is inputted to the lower arm 30 by the protruding member 40 moving to the vehicle body rearward-inner side or the like, the pivot portion 32 (including the bolt 52) breaks a portion of the periphery of the hole portion 23A in the vertical wall 23.

As a result, the pivot portion 32 of the lower arm 30 is detached from the vertical wall 23. Thus, the pivot portion 32 of the lower arm 30 is disengaged from the suspension member 20. Herein, a weakened portion such as, for example, a thinned plate portion, hole portions, a bead portion or the like (not shown in the drawings) may be formed in advance at the periphery of the hole portion 23A in the vertical wall 23 at the vehicle body rearward side, such that detachment of the pivot portion 32 therefrom is easier (i.e., such that the periphery of the hole portion 23A is easier to break).

When the pivot portion 32 of the lower arm 30 has been released from the suspension member 20 at an early stage after a micro-wrap collision (or an offset collision), the rear portion side of the front wheel 38 will not be pulled to the vehicle width direction inner side by the lower arm 30.

Figure 6:
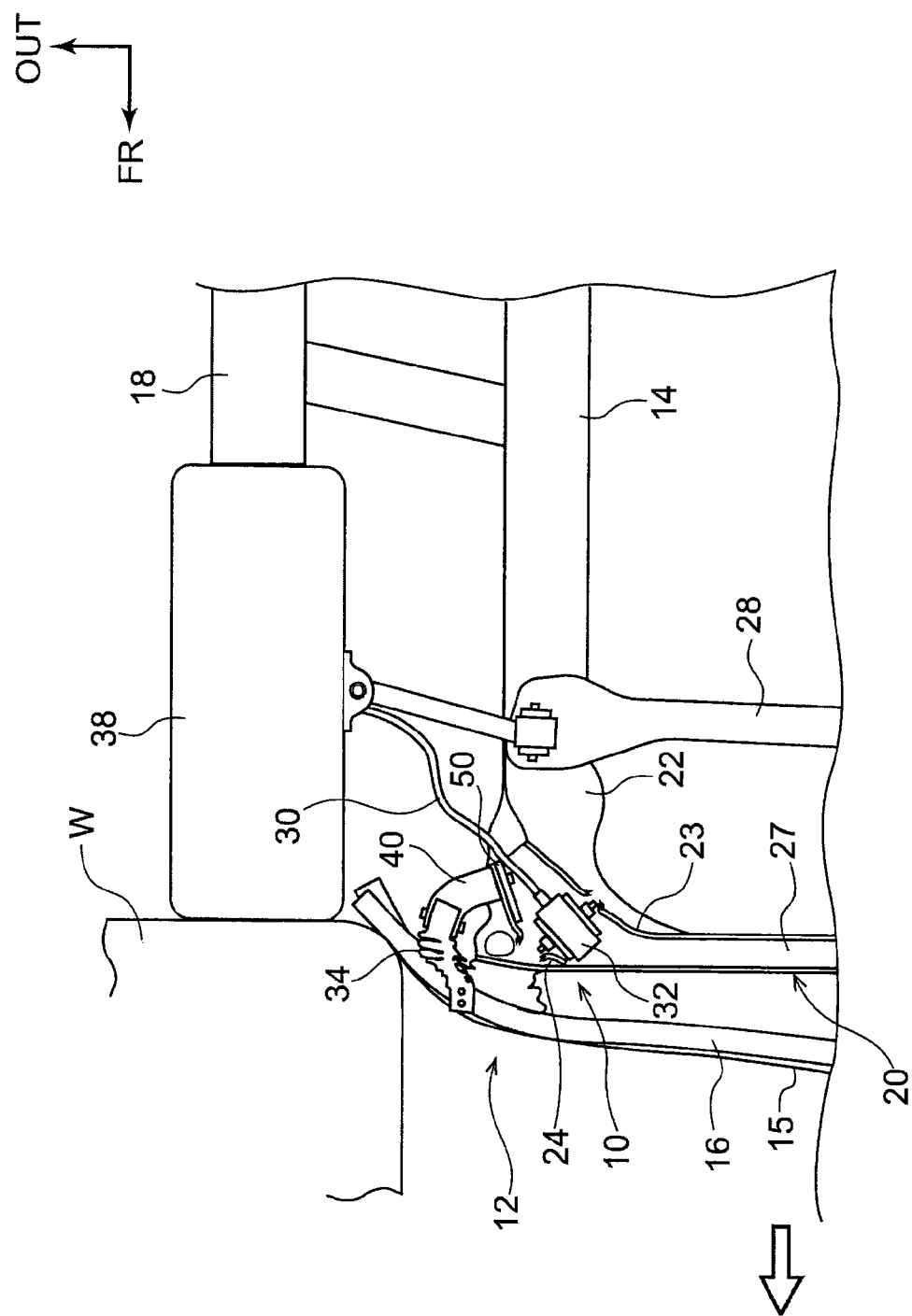
FIG. 6 is a bottom view showing a state in which, due to the micro-wrap collision, the front wheel that has collided with the barrier abuts against a front end portion of a rocker.

Therefore, after a micro-wrap collision (or an offset collision) of the vehicle 12, turning of the rear portion side of the front wheel 38 to the vehicle width direction inner side relative to the rocker 18 in bottom view (plan view) may be suppressed or prevented. Therefore, the front wheel 38 may be arranged with the diametric direction thereof along the vehicle body front-and-rear direction. Thus, as shown in FIG. 6, the front portion side of the outer periphery face of the front wheel 38 may come into contact with the barrier W and the rear portion side of the outer periphery face of the front wheel 38 may come into contact with the vehicle body forward side end portion of the rocker 18.

That is, when the vehicle 12 has a micro-wrap collision (or an offset collision) with the barrier W, the front wheel 38 that is disposed such that the turning axis direction thereof is substantially perpendicular to the vehicle body front-and-rear direction may be interposed (sandwiched) between the barrier W and the rocker 18 in bottom view (plan view). Thus, the impact load inputted from the barrier W to the front wheel 38 may be transmitted from the front wheel 38 to the rocker 18 in the axial direction thereof.

The rocker 18, being a vehicle body framework member of the vehicle 12, has high strength and stiffness with respect to an impact load inputted in the vehicle body front-and-rear direction (the axial direction). Therefore, even though the impact load at the time of a micro-wrap collision (or an offset collision) is transmitted to the rocker 18 in the axial direction thereof via the front wheel 38, a strong axial reaction force to the impact load may be obtained and deformation of the rocker 18 may be suppressed or prevented. Therefore, when a micro-wrap collision (or an offset collision) of the vehicle 12 occurs, deformation of the vehicle cabin may be suppressed or prevented.

—Second Exemplary Embodiment—

Now, the vehicle body front portion structure 10 is described in accordance with a second exemplary embodiment. Portions that are the same as in the first exemplary embodiment are assigned the same reference symbols and detailed descriptions thereof (including operations that are the same) are omitted as appropriate.

Figure 7:
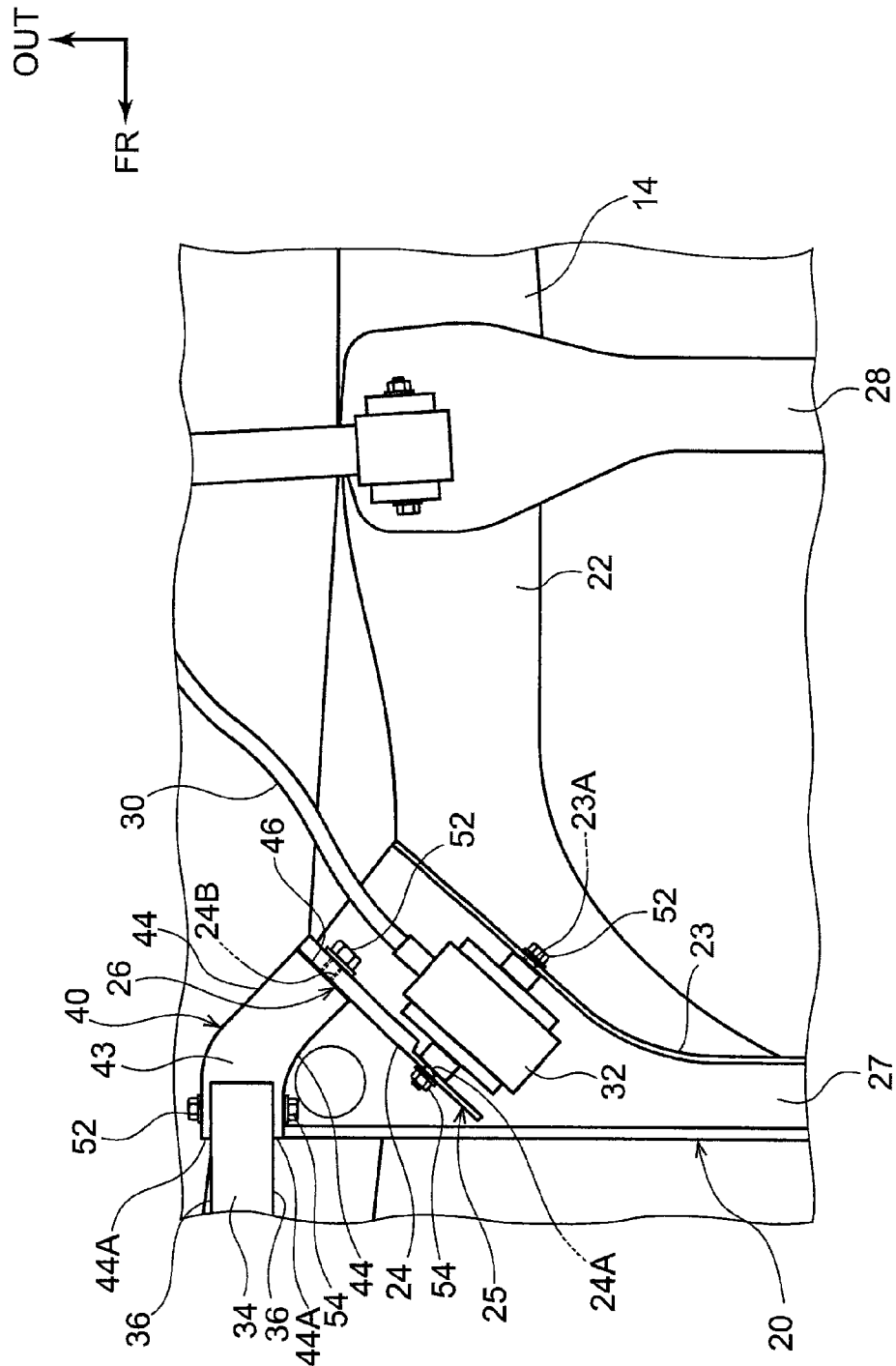
FIG. 7 is a bottom view showing an enlargement of a portion of a vehicle body front portion structure in accordance with a second exemplary embodiment.

As shown in FIG. 7, in the vehicle body front portion structure 10 according to the second exemplary embodiment, instead of the reinforcing plate 50 being provided, the plate thickness of the fastening portion 26 of the vertical wall 24 at the vehicle body forward side (the vehicle width direction outer side of the vertical wall 24, including the hole portion 24B) is made thicker than the plate thickness of the coupling portion 25 (the vehicle width direction inner side of the vertical wall 24, including the hole portion 24A). Thus, a structure is formed such that the strength of the fastening portion 26 is higher than the strength of the coupling portion 25.

Therefore, even though the reinforcing plate 50 is not provided, when an impact load is inputted to the protruding member 40 from the vehicle body forward side, the fastening portion 26 is pushed to the vehicle width direction inner side as the protruding member 40 moves to the vehicle body rearward-inner side, and thus the coupling portion 25 that is a portion of the vertical wall 24 may be twisted and broken. That is, the pivot portion 32 of the lower arm 30 that has been coupled to the coupling portion 25 may be detached from the coupling portion 25 (the vertical wall 24) at an early stage after a collision of the vehicle 12.

Hereabove, the vehicle body front portion structure 10 according to the present exemplary embodiments has been described on the basis of the attached drawings. However, the vehicle body front portion structure 10 according to the present exemplary embodiments is not limited to the illustrated structures; suitable design modifications may be applied within a scope not deviating from the spirit of the present invention. For example, the structure in which the protruding member 40 and the front bumper reinforcement 16 are linked by the front member 34 is not limiting.

Furthermore, a structure in which the fastening portion 26 (the vehicle width direction outer side of the vertical wall 24, including the hole portion 24B) has a higher strength than the coupling portion 25 (the vehicle width direction inner side of the vertical wall 24, including the hole portion 24A) is sufficient. The structures in which the reinforcing plate 50 is provided at the inner face side of the fastening portion 26 or the plate thickness of the fastening portion 26 is thicker than the plate thickness of the coupling portion 25 are not limiting.

Moreover, a structure is possible in which the first exemplary embodiment and the second exemplary embodiment are combined. That is, the plate thickness of the fastening portion 26 of the vertical wall 24 at the vehicle body forward side may be made thicker than the plate thickness of the coupling portion 25, and the fastening portion 26 may be nipped by the rear wall 46 and the reinforcing plate 50 and the protruding member 40 fastened to the fastening portion 26.

What is claimed is:

1. A vehicle body front portion structure comprising:
   a suspension member, a side portion of the suspension member being disposed at a vehicle body lower side of a front side member;
   a vertical wall that is formed at the suspension member and that includes a coupling portion to which a vehicle width direction inner side end portion of a lower arm is coupled, the lower arm supporting a front wheel; and
   a protruding member that is fastened to a fastening portion provided in the vertical wall, at a vehicle width direction outer side relative to the coupling portion, so as to protrude to the vehicle width direction outer side relative to the front side member in plan view.

2. The vehicle body front portion structure according to claim 1, wherein the protruding member and a front bumper reinforcement are linked by a front member.

3. The vehicle body front portion structure according to claim 1, wherein the protruding member sandwiches the fastening portion with a reinforcing plate and is fastened to the fastening portion, the reinforcing plate extending to the coupling portion.

4. The vehicle body front portion structure according to claim 1, wherein a plate thickness of the fastening portion is thicker than a plate thickness of the coupling portion.

5. The vehicle body front portion structure according to claim 1, wherein the protruding member is structured with a higher strength than the suspension member.

\* \* \* \* \*